United States Patent [19]

Smith

[11] Patent Number: 4,984,266
[45] Date of Patent: Jan. 8, 1991

[54] SUBSCRIBER LINE CARD ARRANGEMENT
[75] Inventor: Robert Smith, Geneva, Switzerland
[73] Assignee: Motorola, Inc., Schaumburg, Ill.
[21] Appl. No.: 312,378
[22] Filed: Sep. 6, 1988

Related U.S. Application Data

[63] Continuation of Ser. No. 48,094, filed as PCT GB86/00525 on Sep. 4, 1986, abandoned.

[30] Foreign Application Priority Data

Sep. 5, 1985 [GB] United Kingdom ............... 8522069

[51] Int. Cl.$^5$ ................................................ H04J 3/04
[52] U.S. Cl. .................................... 379/399; 379/383
[58] Field of Search ....................... 579/399, 383, 384; 370/58, 112

[56] References Cited

U.S. PATENT DOCUMENTS 4,451,708  5/1984  Kemler et al. ............... 379/399 X

FOREIGN PATENT DOCUMENTS 2022367  12/1979  United Kingdom .

Primary Examiner—David Mis
Attorney, Agent, or Firm—Robert L. King

[57] ABSTRACT

A subscriber line card arrangement, in which each of eight subscriber lines is interfaced by a respective high voltage analog circuit, followed by a low voltage circuit for producing essential analog functions including over-sampled analog-to-digital and digital-to-analog conversion. A single CMOS digital signal processor (DSP) is multiplexed between each of the eight channels to perform digitial signal processing of the telephone signals in each channel. Silicon usage for the high voltage functions is reduced as is the amount of bipolar analog circuitry. Digital hardware is saved by multiplexing the DSP. The invention is useful in central offices and PABX's.

10 Claims, 2 Drawing Sheets

SUBSCRIBER LINE CARD ARRANGEMENT

This application is a continuation of application Ser. No. 048,094, filed as PCT GB86/00525 on Sep. 4, 1986, now abandoned.

FIELD OF INVENTION

This invention relates to a subscriber line card arrangement for use in a central office telephone exchange or in a PABX.

BACKGROUND ART

In a known exchange a two-wire subscriber line is coupled by line card circuitry to the PCM highway of the exchange.

The line card architecture for each line comprises a high voltage circuit, often formed by discrete high voltage components, coupled directly to the incoming subscriber line; a subscriber line interface circuit (SLIC) together with a trans-hybrid balance network and a COFIDEC circuit. A single line card controller couples the COFIDEC circuit of each line to the PCM highway.

The SLIC performs a conversion from the two-wire balanced subscriber line to a four-wire line having separate transmission lines for signals being transmitted to or received from the exchange, off hook detection and ring trip, D.C. line feed (either constant current or constant voltage) and two-wire impedance matching.

The trans-hybrid balance network ensures that the signals on the receive wire of the four-wire line do not appear on the transmit line.

The COFIDEC circuit performs analogue-to-digital and digital-to-analogue conversion of the four-wire signals, performs gain and frequency adjustment and data compression and expansion from typically 13 bits to the usual 8 bits of the exchange's PCM highway.

A known example of a SLIC is the Motorola MC3419 whilst a typical COFIDEC circuit is the MOTOROLA MC14400 family.

The above known subscriber line card architecture has several disadvantages. Firstly, the high voltage interface to the subscriber line has generally been formed by discrete components.

Of necessity the COFIDEC has been fabricated in CMOS integrated circuit technology since known digital bipolar processes would not be able to produce such a complex circuit of sufficient compactness. However, since the COFIDEC provides some analog signal processing, the effecting of such processing in CMOS circuits tends to worsen overall noise performance.

This invention seeks to provide a subscriber line card arrangement in which, at least in a preferred embodiment, hardware is reduced and one or more of the above mentioned disadvantages is mitigated.

BRIEF DESCRIPTION OF INVENTION

According to this invention there is provided a subscriber line card arrangement for use in a central office or PABX comprising, for each of a plurality of subscriber lines, analogue circuitry including a relatively high voltage portion for interfacing the subscriber line and a relatively low voltage portion for performing predetermined analogue functions including over-sampled analogue-to-digital and digital-to-analogue conversion and wherein a single digital signal processor is time shared for processing digital signals for each of the plurality of subscriber lines.

In an embodiment of the invention the digital signal processor is time shared between eight subscriber lines.

An exemplary embodiment of the invention will now be described with reference to the drawings in which.

DESCRIPTION OF PREFERRED EMBODIMENT

Figure 1:
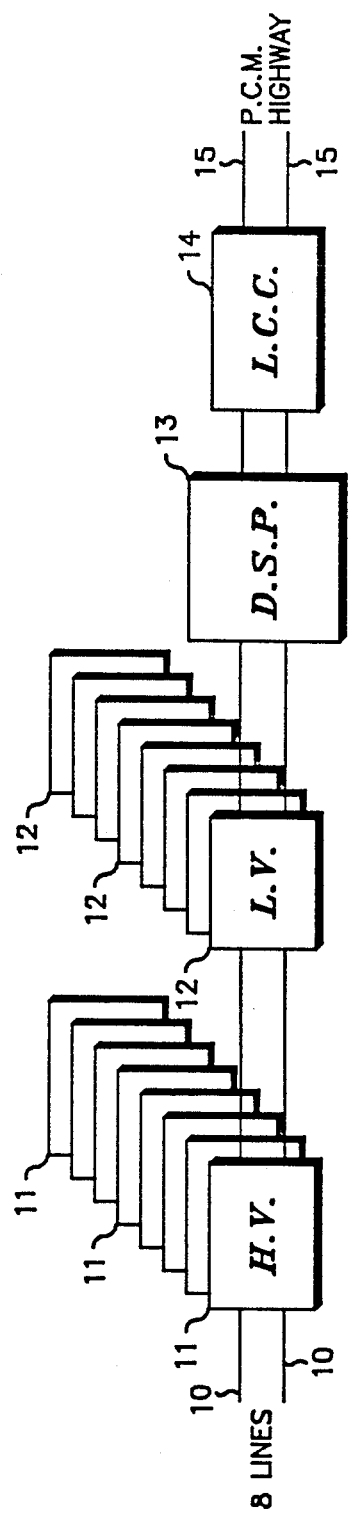
FIG. 1 shows a schematic block diagram of a subscriber line card arrangement of the invention.

Referring now to FIG. 1 each of a plurality, in this example eight, of two-wire subscriber telephone lines 10 is received in the exchange by respective high voltage (H.V.) interface circuits 11, each of which feeds a respective low voltage (L.V.) predominantly analog, circuit 12. A single digital signal processor (D.S.P.) 13 is time-division-multiplexed between each of the low voltage circuits 12, output signals from the digital signal processor 13 being fed together with those of similar digital processors (not shown) handling different groups of subscriber line signals (not shown), to a PCM highway 15 under the control of a line card controller (L.C.C.) circuit 14.

Each high voltage circuit 11 is a relatively simple circuit for interfacing the relatively high voltage of the subscriber lines 10 with the lower line voltages of the rest of the line card arrangement. The relatively low voltage analog circuit 12, utilizes a minimum of bipolar technology to perform only the essential analog functions on the telephone signals, passing from the subscribers into the exchange, or in the reverse direction.

These analog functions include two-to-four-wire conversion in which differential signals on the two-wire subscriber lines are converted to four-wire unbalanced signals and vice versa, setting of the DC loop characteristic, off hook detection, trimming for common mode rejection and generation, anti-aliasing and reconstruction filtering and analog to digital and digital to analog conversion.

The anti-aliasing filter band limits incoming speech signals to below the nyquist limit of the analog-to-digital converter, typically to 2MHz in the present example. The reconstruction filter is effectively an integrator which performs the digital-to-analog conversion on signals fed from the digital signal processor 13 to the low voltage analog circuits 12.

Since the single digital processor 13 is time-division-multiplexed between each of the eight low voltage analog circuits 12, the analog-to-digital converter in each low voltage circuit 12 is over-sampled to provide an output of the low voltage analog circuit 12, which is a 4MHz over-sampled digital speech signal.

The present invention is not limited to any particular circuits for performing the high voltage interface and low voltage analog functions described above. Typically each high voltage circuit 11, together with its corresponding low voltage analog circuit 12, may be formed by the arrangement disclosed in International Publication No. W084/03191 used together with any known suitable digital-to-analog and analog-to-digital converter. Alternatively the similar circuit functions may be achieved by utilising a Motorola MC3419 SLIC.

Figure 2:
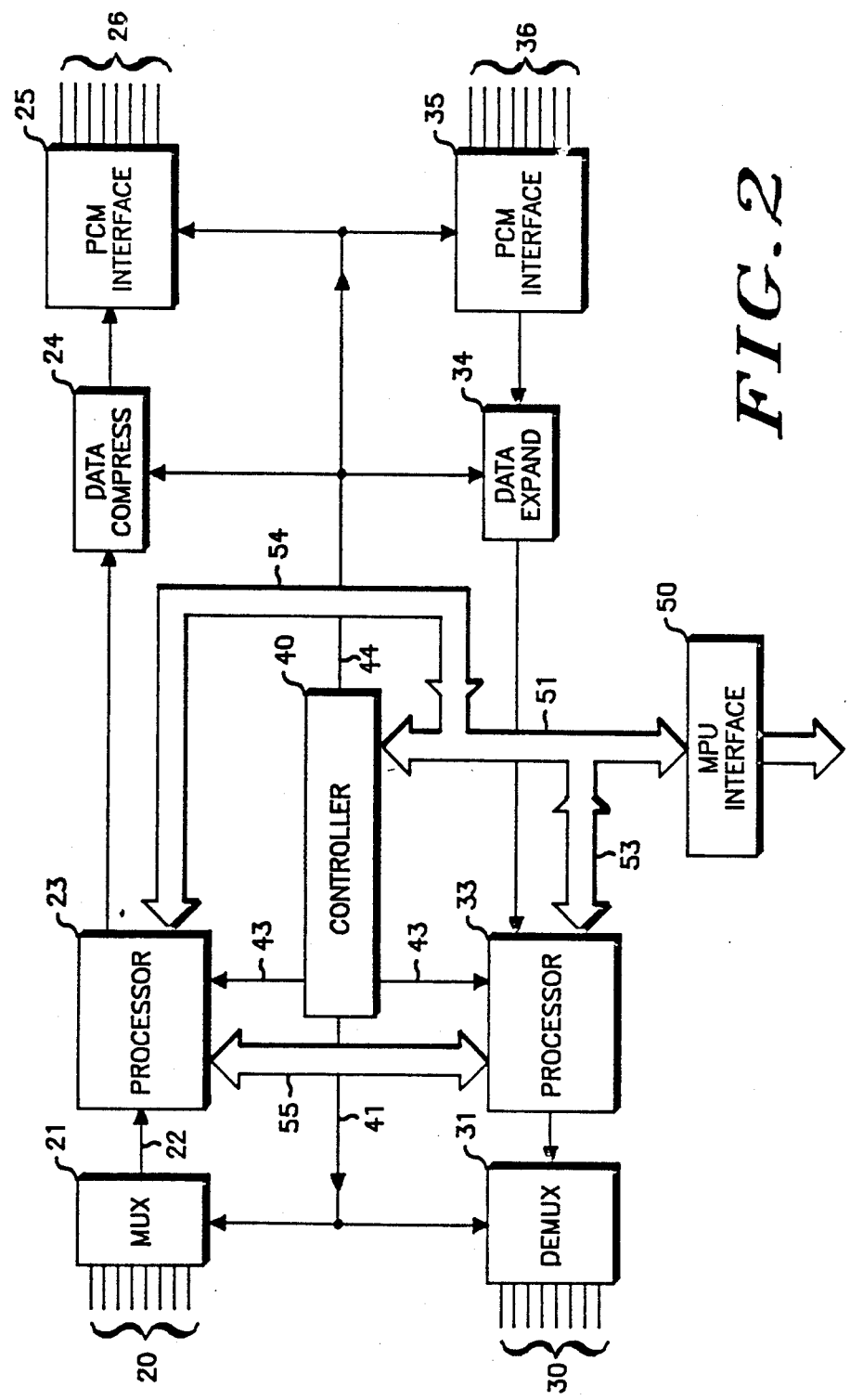
FIG. 2 is a more detailed block diagram of an example of a digital signal processor suitable for use in the arrangement of FIG. 1.

Referring now to FIG. 2, there is shown a more detailed block diagram of the digital signal processor 13 of the arrangement of FIG. 1. In the transmit direction in which signals are fed from the subscriber lines into the exchange, the 4MHz over-sampled digital speech signals from each of the low voltage analog circuits 12, are received by respective input terminals 20, of a multiplexer 21.

The multiplexer 21 is coupled via a line 22 to a digital processor 23 whose output is fed via a data compression circuit 24 and a PCM interface 25, to an output highway 26 for coupling, under the control of the line card controller 14 of FIG. 1, to the PCM highway 15.

In the receive direction, in which signals are fed from the exchange to the subscriber lines, data on the PCM highway 36 is extracted by the PCM interface 35 and fed, via a data expander 34, to a digital processor 33 and thence to a demultiplexer circuit 31. The demultiplexer circuit 31 provides eight outputs 30 which are coupled to respective ones of the low voltage analog circuits 12.

Operation of the transmit and receive paths of the digital signal processor is under the control of a controller 40, which has an output 41 coupled to the multiplexer 21 and the demultiplexer 31, outputs 43 coupled to the processors 23 and 33, and an output 44 coupled to the data compression and expanding circuits 24 and 34 and to the PCM interfaces 25 and 35.

The controller 40 is itself coupled to a micro processor interface 50, via a data highway 51 and via further data highways 53 and 54 to the two digital processors 33 and 23 respectively. The digital processors 23 and 33 are themselves interconnected by means of a further data highway 55.

Since the transmit and receive paths of the digital signal processor essentially perform converse functions the operation will be described in detail with reference only to the transmit direction.

The 4MHz over-sampled digital signals are fed from the eight low voltage analog circuits 12 and are received at respective ones of the terminals 20, after having been passed through decimation filters (not shown), which change the data rate on each of the eight subscriber line channels, from the four megahertz sampled data rate, to 64KHz. The multiplexer 21 then multiplexes these eight channels onto a single thirteen bit channel 22, at a data rate of 512KHz (e.g. eight times 64KHz).

The digital processor 23 performs in the transmit direction a further decimation, in which the sampling frequency i.e. the data rate, is changed from 512KHz to 64KHz and also performs CCITT band limiting. In the receive direction the processor 33 performs a similar CCITT band limiting together with interpolation, and the two digital processors 33 and 23 act together via the data highway 55 to perform two-wire impedance simulation and hybrid balance (i.e. echo cancellation).

The digital processor 23 provides a multiplexed fourteen bit output signal at 64KHz data rate which is fed to the data compression circuit 24, which performs an A or MU law data compression, to reduce the number of bits from fourteen to eight. The 64KHz eight bit compressed multiplexed signals, provided at the output of the data compression circuit 24, are fed to the PCM interface 25, which is operative to demultiplex the eight channels, into eight two-way serial data lines, each having a data rate of 8KHz. These eight serial data lines form the data highway 26, the eight channels of which are then further multiplexed onto the PCM highway 15, by means of the line card controller 14 of FIG. 1.

Timing and sequencing for the circuit is controlled by the controller 40, the multiplexer 21 and the demultiplexer 31, being controlled via the output 41 of the controller, the digital processors 23 and 33 being controlled via the lines 43, and the data compression and expansion circuits 24 and 34, together with the PCM interfaces 25 and 35, being controlled via the output 44 of the controller.

Basically the controller 40 comprises a micro code ROM, typically in the form of a programmable logic array (PLA), which is programmed with the filter algorithms for the processors 23 and 33, which algorithms correspond to the types of telephone lines with which the digital signal processor is to be used. The filter algorithms are loaded into the processor 23 via the data highway 54 whilst the processor 33 is fed over the data highway 53.

The microprocessor interface 50, which is coupled to the controller 40 via the data highway 51, allows microprocessor intervention and allows initial downloading of the various filter coefficients into the controller 40.

Although, in a preferred embodiment, the digital signal processor of FIG. 2, would be provided as a single integrated circuit chip, it is equally possible to build the digital signal processor using commercially available circuits. For example the digital processors 23 and 33, together with the controller 40, could be provided by two or more TE320 integrated circuits, the number required depending upon the number of subscriber line channels, amongst which the digital signal processor is time shared. By utilizing the TE320 integrated circuits the microprocessor interface 50 could be dispensed with as a separate item, as it is already included on board these chips.

The data compression and expansion circuits 24 and 34 could be provided by any suitable commercially available programmable logic array whilst the PCM interface circuits 25 and 35 could be implemented by IATC2952 line card controllers. Finally the line card controller 14 could be provided by an HDLC interface chip.

In the arrangement of the invention by using one simple high voltage circuit per subscriber line the minimum silicon is used to handle the high voltage functions of the circuit. Also by using one simple low voltage bipolar circuit per line analog-to-digital and digital-to-analog conversion, the minimum amount of bipolar analog circuitry is required. By using a single CMOS digital signal processor to handle the necessary signal processing functions for eight lines in a multiplexed system, the digital hardware is much reduced. This is particularly the case since the processor is an entirely digital circuit which need only store filter coefficients and other parameters once for the plurality of channels. However, this single processor must be capable of operating at eight times the speed of a digital signal processor capable of processing the signals for only a single subscriber line.

The invention has been described by way of example only, and modification may be made without departing from the scope of the invention. For example, although specific commercially available integrated circuits have been mentioned as suitable for constructing the described circuit arrangement, these particular circuits could equally well be replaced by any other known commercially available equivalents. Also, if desired, the digital signal processor 13 could be provided as a single custom designed integrated circuit, as could the high voltage circuits 11 and the low voltage circuits 12. These latter two may be implemented either as individual integrated circuits, or as a single combined integrated circuit.

In the specific example the digital signal processor 13 has been described as being time shared between eight subscriber line channels, this number of channels is only exemplary and may be either more or less depending upon the speed capability of the digital signal processor 13.

I claim:

1. A subscriber line card arrangement for use in a central office or PABX with a predetermined number of groups of multiple subscriber lines, said arrangement comprising:

analog circuit means coupled to each group of multiple subscriber lines including a relatively high voltage portion for interfacing each group of the multiple subscriber lines, and a relatively low voltage portion for performing predetermined analog functions including over-sampled analog-to-digital and digital-to-analog conversion; and a single digital signal processor coupled to the analog circuit means for selectively communicating digital signals with each of the subscriber lines and which is time shared for processing transmitted and received digital signals for each of the groups of multiple subscriber lines, said processing by the single digital signal processor including selectively controlling frequency, two-wire impedance simulation, hybrid balance and data format of the digital signals, thereby avoiding circuitry associated with each subscriber line for implementing said signal processing.

2. The subscriber line card arrangement of claim 1 wherein each group of multiple subscriber lines comprises eight subscriber lines.

3. The subscriber line card arrangement of claim 1 wherein the predetermined number of groups of multiple subscriber lines is eight.

4. The subscriber line card arrangement of claim 1 wherein said single digital signal processor further comprises:

multiplexing means having multiple inputs coupled to the analog circuit means and an output, for multiplexing the digital signals provided by the multiple subscriber lines to a single output;

a first microprocessor having an input coupled to the output of the multiplexing means, and an output, said first microprocessor performing bandlimiting, decimation and echo cancellation on the digital signals received from the multiplexing means;

a data compressing circuit having an input coupled to the output of the first microprocessor, and an output, wherein said data compressing circuit modifies the data's format in accordance with a predetermined data compression algorithm;

a first interface circuit having an input coupled to the output of the data compressing circuit, and an output for providing digital data in PCM format;

a second interface circuit having multiple inputs for receiving digital data from an external communication link in PCM format, and an output, said second interface circuit modifying data format of the received digital data;

a data expansion circuit having an input coupled to the output of the second interface circuit, and an output, wherein said data expansion circuit modifies the data's format in accordance with a predetermined data expansion algorithm;

a second microprocessor having an input coupled to the output of the data expansion circuit, and an output, said second microprocessor performing bandlimiting, interpolation and echo cancellation on the digital signals received by the second interface circuit;

demultiplexing means having an input coupled to the output of the second microprocessor and multiple outputs for providing multiple digital data signals, each of the multiple digital data signals providing data to a predetermined one of the groups of multiple subscriber lines; and control means coupled to the first and second microprocessors, to the first and second data interface circuits, to the multiplexing and demultiplexing means and to the data compressing and data expansion circuits, for controlling the communication of digital data in the single digital signal processor.

5. A method of minimizing circuitry in a subscriber line card arrangement for use in a central office or PABX having a predetermined number of groups of multiple subscriber lines, comprising implementing the subscriber line card arrangement by the steps of:

coupling analog circuit means to each group of multiple subscriber lines, said analog circuit means having a relatively high voltage portion for interfacing each group of the multiple subscriber lines, and a relatively low voltage portion for performing predetermined analog functions including over-sampled analog-to-digital and digital-to-analog conversion;

coupling a single digital signal processor to the analog circuit means for selectively communicating digital signals by transmitting digital data to and receiving digital data from each of the subscriber lines; and time sharing the single digital signal processor with each of the subscriber lines of each group for processing transmitted and received digital signals, said processing including selectively controlling frequency, two-wire impedance simulation, hybrid balance and data format of the digital signals, thereby avoiding circuitry associated with each subscriber line for implementing said signal processing.

6. A subscriber line card arrangement for transmitting digital data to and receiving digital data from a predetermined number of groups of subscriber lines, each group having a plurality of subscriber lines, comprising:

a plurality of first voltage interface circuits equal in number to the predetermined number of groups of subscriber lines, each of said first voltage interface circuits being coupled to a predetermined group of subscriber lines;

a plurality of second voltage interface circuits equal in number to the predetermined number, each of said second voltage interface circuits coupled to a predetermined first voltage interface circuit, said first voltage being greater in magnitude than the second voltage and said second voltage interface circuits performing a predetermined functional operation with the digital data; and a single digital signal processor coupled to each second voltage interface circuit of the plurality of second voltage interface circuits, said single digital signal processor being multiplexed with each of the subscriber lines for selectively communicating digital signals with each of the subscriber lines, said single digital signal processor processing transmitted and received digital signals including selectively controlling frequency, two-wire impedance simulation, hybrid balance and data format of the digital signals, thereby avoiding circuit associated with each subscriber line for implementing said signal processing.

7. A subscriber line card arrangement for use in a central office or PABX with a predetermined number of subscriber lines, said arrangement comprising:

analog circuit means coupled to each subscriber line including a relatively high voltage portion for interfacing each subscriber line, and a relatively low voltage portion for performing predetermined analog functions including over-sampled analog-to-digital and digital-to-analog conversion; and a single digital signal processor coupled to the analog circuit means for selectively communicating digital signals with each of the subscriber lines and which is time shared for processing transmitted and received digital signals for each of the subscriber lines, said processing by the single digital signal processor including selectively controlling frequency, two-wire impedance simulation, hybrid balance and data format of the digital signals, thereby avoiding circuitry associated with each subscriber line for implementing said signal processing.

8. The subscriber line card arrangement of claim 7 wherein the digital processor is time shared between eight subscriber lines.

9. The subscriber line card arrangement of claim 7 wherein said single digital signal processor further comprises:

multiplexing means having multiple inputs coupled to the analog circuit means and an output, for multiplexing the digital signals provided by multiple subscriber lines to a single output;

a first microprocessor having an input coupled to the output of the multiplexing means, and an output, said first microprocessor performing bandlimiting, decimation and echo cancellation on the digital signals received from the multiplexing means;

a data compressing circuit having an input coupled to the output of the first microprocessor, and an output, wherein said data compressing circuit modifies the data's format in accordance with a predetermined data compression algorithm;

a first interface circuit having an input coupled to the output of the data compressing circuit, and an output for providing digital data in PCM format;

a second interface circuit having multiple inputs for receiving digital data from an external communication link in PCM format, and an output, said second interface circuit modifying data format of the received data;

a data expansion circuit having an input coupled to the output of the second interface circuit, and an output, wherein said data expansion circuit modifies the data's format in accordance with a predetermined data expansion algorithm;

a second microprocessor having an input coupled to the output of the data expansion circuit, and an output, said second microprocessor performing bandlimiting, interpolation and echo cancellation on the digital signals received by the second interface circuit;

demultiplexing means having an input coupled to the output of the second microprocessor and multiple outputs for providing multiple digital data signals, each of the multiple digital data signals providing data to a predetermined one of the multiple subscriber lines; and control means coupled to the first and second microprocessors, to the first and second data interface circuits, to the multiplexing and demultiplexing means and to the data compressing and data expansion circuits, for controlling the communication of digital data in the single digital signal processor.

10. A method of minimizing circuitry in a subscriber line card arrangement for use in a central office or PABX having a predetermined number of subscriber lines, comprising implementing the subscriber line card arrangement by the steps of:

coupling analog circuit means to each subscriber line, said analog circuit means having a relatively high voltage portion for interfacing each subscriber line, and a relatively low voltage portion for performing predetermined analog functions including over-sampled analog-to-digital and digital-to-analog conversion;

coupling a single digital signal processor to the analog circuit means for selectively communicating digital signals by transmitting digital data to and receiving digital data from each of the subscriber lines; and time sharing the single digital signal processor with each of the subscriber lines for processing transmitted and received digital signals, said processing including selectively controlling frequency, two-wire impedance simulation, hybrid balance and data format of the digital signals, thereby avoiding circuitry associated with each subscriber line for implementing said signal processing.

* * * * *